(12) United States Patent
Yu

(10) Patent No.: US 8,360,702 B2
(45) Date of Patent: Jan. 29, 2013

(54) SCREW

(76) Inventor: Su-Lan Yu, Kaohsiung (TW)

( * ) Notice: Subject to any disclaimer, the term of this patent is extended or adjusted under 35 U.S.C. 154(b) by 151 days.

(21) Appl. No.: 13/073,457

(22) Filed: Mar. 28, 2011

(65) Prior Publication Data

US 2012/0251268 A1 Oct. 4, 2012

(51) Int. Cl.
*F16B 25/04* (2006.01)
(52) U.S. Cl. ......................... 411/386; 411/411
(58) Field of Classification Search .................. 411/386, 411/411, 412, 416, 387.4, 417
See application file for complete search history.

(56) References Cited

U.S. PATENT DOCUMENTS

| | | | | |
|---|---|---|---|---|
| 3,246,556 A * | 4/1966 | Phipard | ........................... | 411/416 |
| 3,748,949 A * | 7/1973 | Dreger | ........................... | 411/411 |
| 5,044,855 A * | 9/1991 | Fukubayashi | .................. | 411/386 |
| 6,056,491 A * | 5/2000 | Hsu | ............................... | 411/418 |
| 6,254,327 B1 * | 7/2001 | Chen | ............................ | 411/411 |
| 6,926,484 B2 * | 8/2005 | Kram et al. | .................... | 411/311 |
| 2002/0141848 A1 * | 10/2002 | Hsu et al. | ..................... | 411/411 |
| 2011/0110745 A1 * | 5/2011 | Shih | .............................. | 411/386 |

* cited by examiner

*Primary Examiner* — Flemming Saether
(74) *Attorney, Agent, or Firm* — Muncy, Geissler, Olds & Lowe, PLLC

(57) ABSTRACT

A screw includes a screw head and a shank connected to the bottom of the screw head. The screw head has a cavity on the top to be wrenched by a screwdriver. The shank is formed in a cylindrical shape and has a point at a distal end, a triangular thread portion helically formed thereon and extended upwards from the point and a circular thread portion extended contiguously upwards from the triangular thread portion. The triangular thread portion has a plurality of thread cusps formed annularly at different angles. The triangular thread portion and circular thread portion have asymmetrical threads. The triangular thread portion has serrated cutting edges on the circumference. Thus the screw can be screwed into a work piece with less friction force and fastened faster and firmer with less effort.

1 Claim, 5 Drawing Sheets

SCREW

FIELD OF THE INVENTION

The present invention relates to a screw and particularly to an improved screw that has a shank formed with a triangular thread portion coupled with serrated cutting edges to enhance work efficiency and reduce resistance.

BACKGROUND OF THE INVENTION

Screws are widely used for fastening non-metal elements such as wood and plastics. A screw generally has a shank and circular threads formed helically on the shank. Through a point formed at a distal end of the shank to pierce against a work piece, the helical threads of the screw can be screwed into the work piece for fastening.

However, when the screw is screwed into the work piece, the point encounters resistance while it is cutting, and the circular threads are in contact with the work piece in line or surface and also generate a greater friction force during screwing. As a result, users have to exert greater effort and more time to fasten the screw to the work piece, thus construction efficiency suffers. There is still room for improvement.

SUMMARY OF THE INVENTION

In view of the drawbacks of the conventional screws, the present invention aims to provide an improved screw that can save user's effort when in use and also provide faster and firmer fastening.

The screw according to the invention includes a screw head and a shank connected to the bottom of the screw head. The screw head has a cavity on the top to be wrenched by a screwdriver. The shank is formed in a cylindrical shape and has a point at a distal end thereof. The shank further has a triangular thread portion helically formed on the shank and extended upwards from the point, and a circular thread portion extended contiguously upwards from the triangular thread portion. The triangular thread portion has a plurality of thread cusps formed annularly at different angles. The triangular thread portion and circular thread portion have threads formed asymmetrically. The triangular thread portion has serrated cutting edges on the circumference.

By means of the aforesaid structure, the invention can provide many notable benefits as follows:

1. With the threads of the invention formed asymmetrically, the contact area with a work piece during screwing is reduced, hence screwing resistance is smaller and work efficiency is improved.

2. The triangular thread portion has thread cusps in contact with the work piece, thus the friction force generated during screwing is smaller, and fastening efficiency is enhanced.

3. With the serrated cutting edges formed on the circumference of the triangular thread portion, cutting effect can be enhanced to save working time and effort.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENT

Figure 1:
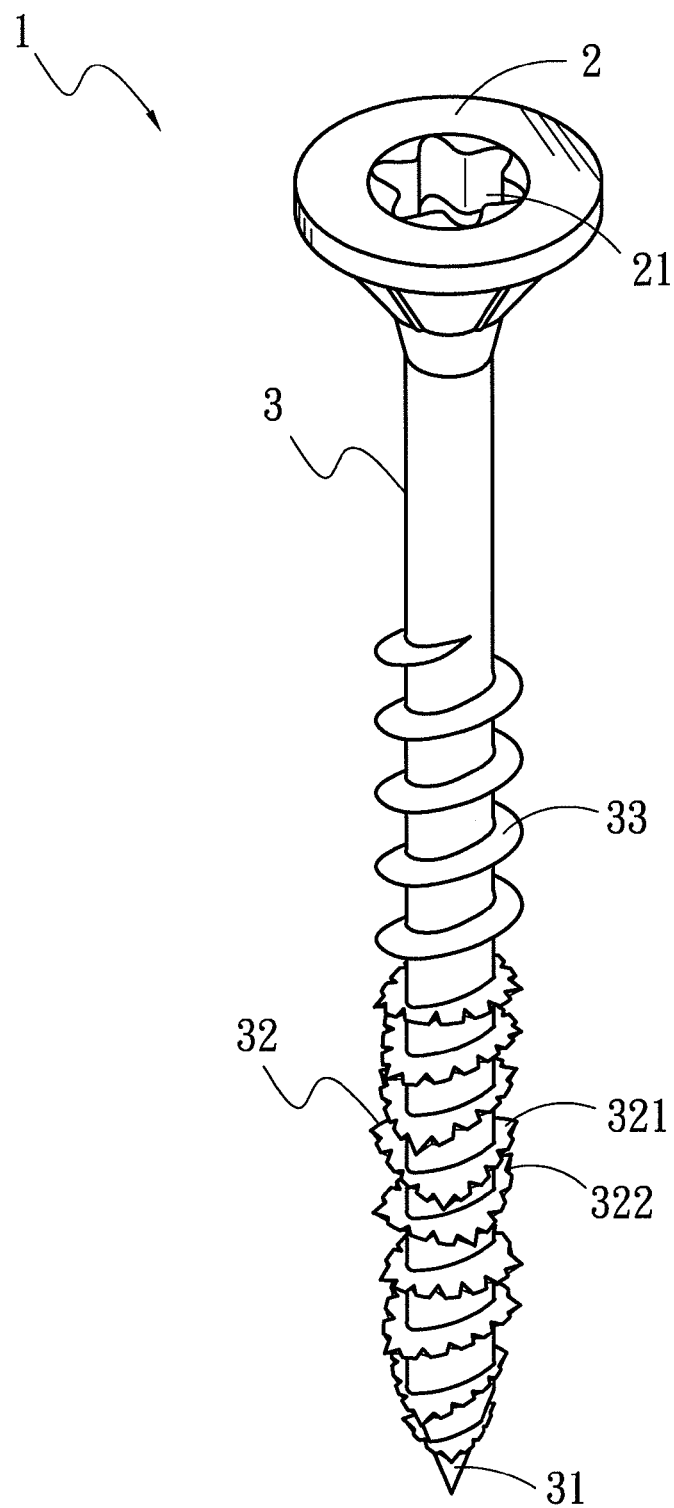
FIG. 1 is a perspective view of the screw of the invention.

Referring to FIGS. 1 through 3B, the present invention provides a screw 1 which includes a screw head 2 and a shank 3.

The screw head 2 has a cavity 21 on the top to be wrenched by a screwdriver.

The shank 3 is connected to the bottom of the screw head 2 and has a point 31 at a distal end thereof. The invention further provides features as follows: the shank 3 is formed in a cylindrical shape and includes a triangular thread portion 32 formed helically on the shank and extended upwards from the point 31 and a circular thread portion 33 extended contiguously upwards from the triangular thread portion 32. The triangular thread portion 32 has a plurality of thread cusps 321 formed annularly at different angles (referring to FIG. 3B). The triangular thread portion 32 and circular thread portion 33 have threads formed asymmetrically. The triangular thread portion 32 has serrated cutting edges 322 on the circumference to reduce the friction force during screwing and enhance fastening efficiency.

Figure 2:
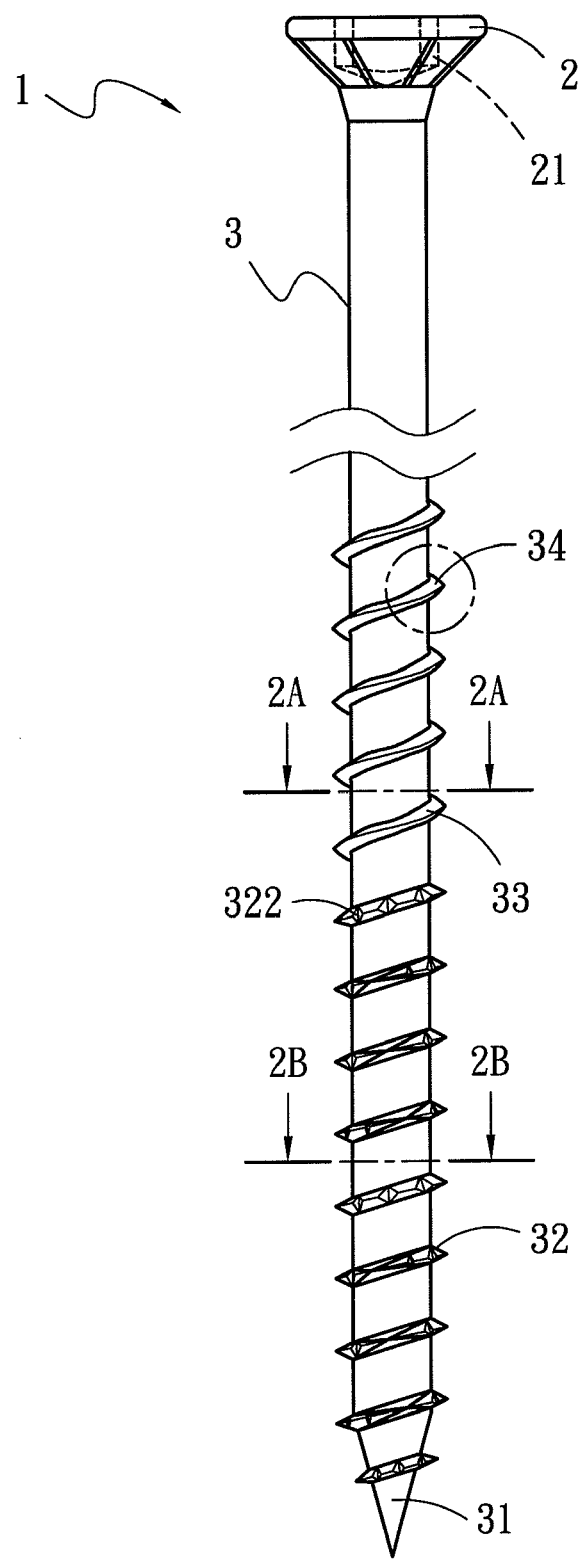
FIG. 2 is a front view of the screw of the invention.
Figure 3A:
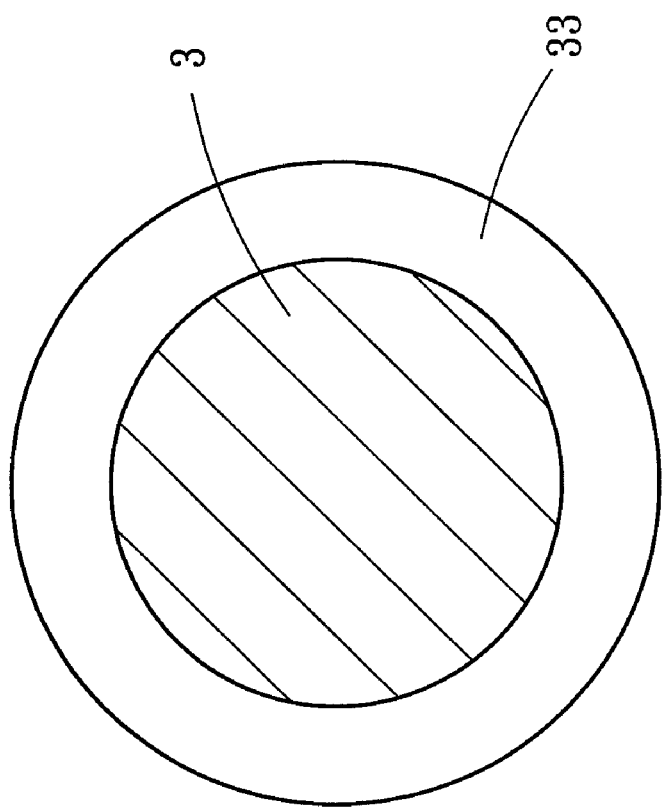
FIG. 3A is a cross section taken on line 2A-2A in FIG. 2.
Figure 3B:
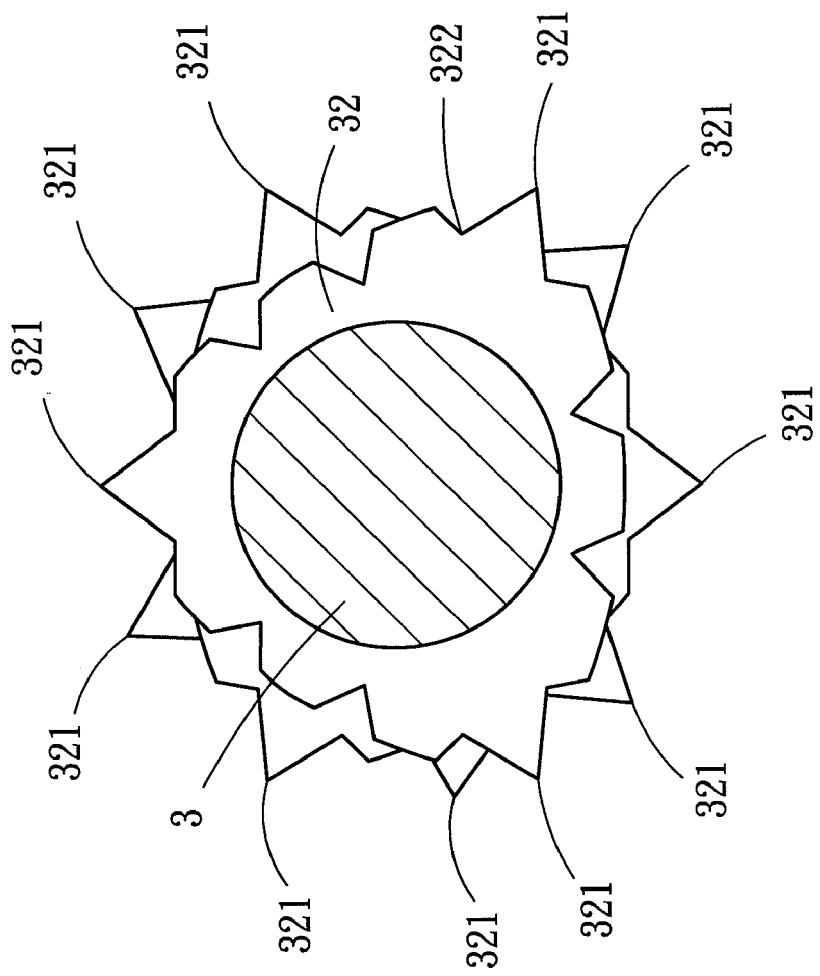
FIG. 3B is a cross section taken on line 2B-2B in FIG. 2.
Figure 4:
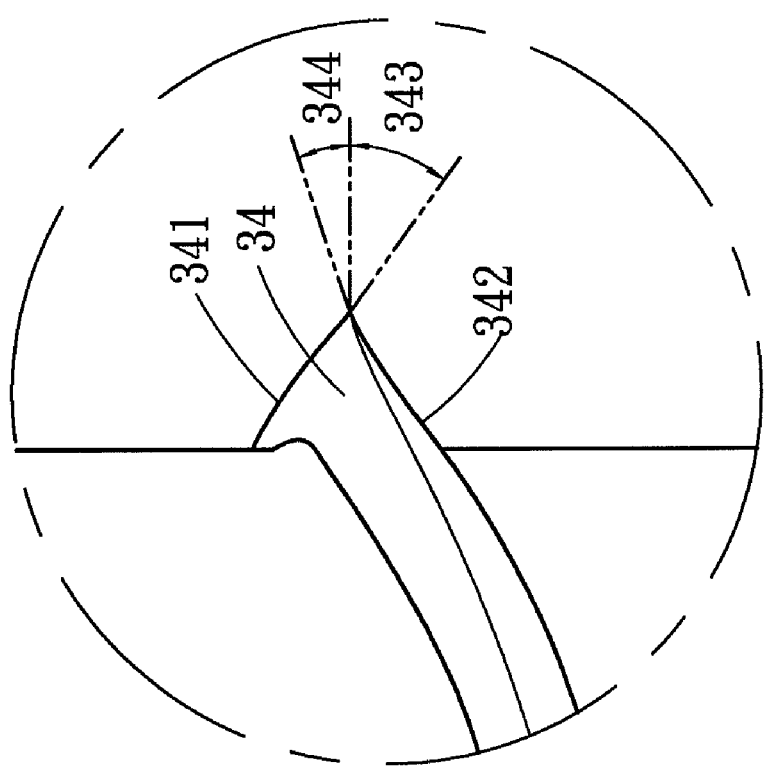
FIG. 4 is a fragmentary enlarged view of the asymmetrical threads according to FIG. 2.

Besides, referring to FIGS. 2 and 4, the triangular thread portion 32 and the circular thread portion 33 respectively has a thread edge 34 which has a first cutting surface 341 forming a first angle 343 with the horizontal surface and a second cutting surface 342 forming a second angle 344 with the horizontal surface. The first angle 343 and the second angle 344 are non-equiangular to form the asymmetrical threads of the triangular thread portion 32 and the circular thread portion 33. The first angle 343 is preferably formed at thirty degrees, while the second angle 344 is preferably formed at ten degrees.

By means of the aforesaid structure, when the screw 1 of the invention is in use, the point 31 of the shank 3 pierces against a work piece and a screwdriver is wedged in the cavity 21 of the screw head 2 to perform wrenching so that the triangular thread portion 32 can be screwed into the work piece; the thread cusps 321 of the triangular thread portion 32 are formed annularly at different angles to form point contact with the work piece to reduce the friction force during screwing. Moreover, the serrated cutting edges 322 of the triangular thread portion 32 can improve cutting effect during screwing. By incorporating with the asymmetrical threads, users can wrench the screw 1 with smaller effort, and the screw 1 can be firmly screwed into the work piece to form secure and tight fastening due to squeezing.

What is claimed is:

1. A screw, comprising:
    a screw head including a cavity on the top to be wrenched by a screwdriver; and
    a cylindrical shank which is connected to the bottom of the screw head and includes a point at the distal end; the shank including a triangular thread portion annularly formed thereon and extended upwards from the point and a circular thread portion extended contiguously upwards from the triangular thread portion; the triangular thread portion including a plurality of thread cusps formed annularly at different angles; the triangular thread portion and the circular thread portion including asymmetrical threads; the triangular thread portion further including serrated cutting edges on the circumference thereof.

* * * * *